Sept. 8, 1936.  S. LOEWE ET AL  2,053,526
TELEVISION RECEPTION DEVICE
Filed Dec. 23, 1931

Inventor:
Siegmund Loewe
Manfred van Ardenne

Patented Sept. 8, 1936

2,053,526

UNITED STATES PATENT OFFICE 2,053,526

TELEVISION RECEPTION DEVICE

Siegmund Loewe and Manfred von Ardenne, Berlin, Germany; said Von Ardenne assignor to Radioaktiengesellschaft D. S. Loewe, Berlin-Steglitz, Germany, a company of Germany Application December 23, 1931, Serial No. 582,736
In Germany December 22, 1930

2 Claims. (Cl. 250—27.5)

The present invention relates to an improvement in association with television receivers.

In television devices with Braun tubes comprising an enclosing vessel containing a cathode, deflecting electrodes, an anode and a picture screen, disturbances occur on the screen, caused by irregularities of the scanning as well as by reflections on the walls of the valve etc., which cannot be removed at all or at least only to a very little extent by influencing the deflecting voltages or the scanning rays. These irregularities of the scanning may for instance be caused by the scanning velocity not being constant.

At the same time there also occurs by reason of the zero reversing speed at the apices a particular brightness at the edge which, together with the distortion, greatly affects the impression of the image. According now to the invention, this outer edge portion is not employed for transmission of the image, and in the case of the receiver is covered by a frame. Naturally it is also sufficient to merely cover the two particularly light sides alone by means of strips.

The invention is illustrated in the figures in two forms or embodiments.

Figure 1:
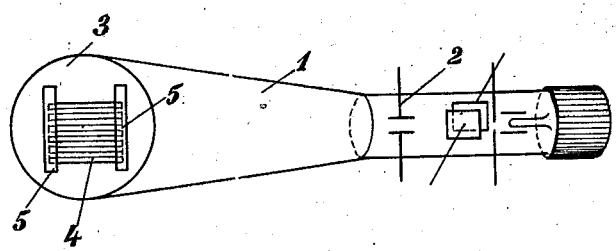
Figure 2:
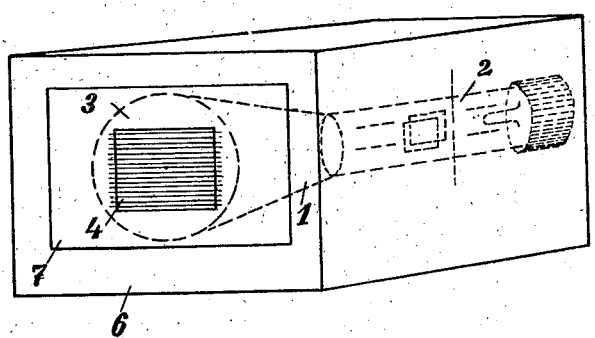

Figure 1 shows a Braun tube I with the system parts 2. Two sides of the picture 4 appearing on the fluorescent screen 3 are covered by borders 5. In Figure 2 there is illustrated a cabinet 6, in which the Braun tube I containing the system parts 2 is arranged. The edges of the picture appearing on the fluorescent screen 3 are covered against sight by a frame 7.

We claim:

1. A Braun tube comprising an enclosing vessel having a transparent wall and containing a cathode, deflecting electrodes, an anode, and a screen adapted to have an image formed thereon observable through a portion of the vessel wall, and means adapted to hide from view the outer marginal edges of the image being mounted outside said Braun tube.

2. A Braun tube comprising an enclosing vessel having a transparent wall and containing a cathode, deflecting electrodes, an anode, and a screen adapted to have an image formed thereon observable through a portion of the vessel wall, and an opaque border adapted to hide from view the outer marginal edges of the image being mounted outside said Braun tube.

SIEGMUND LOEWE.
MANFRED von ARDENNE.